(12) United States Patent
Bautista Gabriel et al.

(10) Patent No.: US 12,237,832 B2
(45) Date of Patent: Feb. 25, 2025

(54) CIRCUITS AND METHODS FOR SUPPLY VOLTAGE DETECTION AND TIMING MONITORING

(71) Applicant: Intel Corporation, Santa Clara, CA (US)

(72) Inventors: Miguel Bautista Gabriel, Portland, OR (US); Sriram Vangal, Portland, OR (US); Patrick Koeberl, Portland, OR (US); Pratik Patel, Hillsboro, OR (US); Muhammad Khellah, Tigard, OR (US); James Tschanz, Portland, OR (US); Carlos Tokunaga, Beaverton, OR (US); Suyoung Bang, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 644 days.

(21) Appl. No.: 17/479,963

(22) Filed: Sep. 20, 2021

(65) Prior Publication Data

US 2022/0006459 A1   Jan. 6, 2022

(51) Int. Cl.
*H03K 19/177* (2020.01)
*G01R 31/28* (2006.01)
(Continued)

(52) U.S. Cl.
CPC ... *H03K 19/17768* (2013.01); *G01R 31/2827* (2013.01); *H03K 19/01759* (2013.01); *H03K 19/01855* (2013.01); *H03K 19/17784* (2013.01)

(58) Field of Classification Search
CPC ......... G01R 31/2827; H03K 19/01759; H03K 19/01855; H03K 19/17768; H03K 19/17784
See application file for complete search history.

(56) References Cited

U.S. PATENT DOCUMENTS 7,639,054 B1 * 12/2009 Burney ................ H03L 7/0816
327/262
9,229,054 B2   1/2016 Bowman et al.
(Continued)

FOREIGN PATENT DOCUMENTS

EP   3901639   4/2020

OTHER PUBLICATIONS

European Patent Office, European Search Report and Search Opinion for European patent application 22181831.3, Dec. 20, 2022, pp. 1-11.

(Continued)

*Primary Examiner* — Kurtis R Bahr
(74) *Attorney, Agent, or Firm* — InventIQ Legal LLP; Steven J. Cahill

(57) ABSTRACT

A detection circuit includes a tunable delay circuit that generates a delayed signal and that receives a supply voltage. The detection circuit includes a control circuit that adjusts a delay provided by the tunable delay circuit to the delayed signal. The detection circuit includes a time-to-digital converter circuit that converts the delay provided by the tunable delay circuit to the delayed signal to a digital code and adjusts the digital code based on changes in the supply voltage. The control circuit causes the tunable delay circuit to maintain the delay provided to the delayed signal constant in response to the digital code reaching an alignment value. The detection circuit may continuously monitor timing margin of a data signal relative to a clock signal and update the digital code in every clock cycle. The detection circuit may be a security sensor that detects changes in the supply voltage.

20 Claims, 9 Drawing Sheets

(51) Int. Cl.
*H03K 19/0175* (2006.01)
*H03K 19/0185* (2006.01)
*H03K 19/17768* (2020.01)
*H03K 19/17784* (2020.01)

(56) References Cited

U.S. PATENT DOCUMENTS

| | | | | |
|---|---|---|---|---|
| 9,660,653 | B1* | 5/2017 | Khor | H03L 7/0818 |
| 10,784,874 | B1 | 9/2020 | Bang et al. | |
| 2013/0214831 | A1* | 8/2013 | Park | G01R 19/255 |
| | | | | 327/156 |
| 2020/0226295 | A1* | 7/2020 | Patel | G06F 11/0772 |
| 2020/0395849 | A1* | 12/2020 | Labbe | G06F 1/08 |
| 2021/0242872 | A1* | 8/2021 | Bang | H03M 1/00 |

OTHER PUBLICATIONS

James Tschanz et al., "Tunable Replica Circuits and Adaptive Voltage-Frequency Techniques for Dynamic Voltage, Temperature, and Aging Variation Tolerance," 2009 Symposium on VLSI Circuits Digest of Technical Papers, pp. 112-113.

Keith A. Bowman et al., "Energy-Efficient and Metastability-Immune Resilient Circuits for Dynamic Variation Tolerance," IEEE Journal of Solid-State Circuits, vol. 44, No. 1, Jan. 2009, 2008 IEEE, pp. 49-63.

Suyoung Bang et al., "A Fully Synthesizable Distributed and Scalable All-Digital LDO in 10nm CMOS," 2020 IEEE International Solid-State Circuits Conference, Feb. 19, 2020, pp. 380-382.

* cited by examiner

CIRCUITS AND METHODS FOR SUPPLY VOLTAGE DETECTION AND TIMING MONITORING

FIELD OF THE DISCLOSURE

The present disclosure relates to electronic circuits, and more particularly, to circuits and methods for supply voltage detection and timing monitoring in integrated circuits.

BACKGROUND

An attacker can attempt voltage tampering of an integrated circuit by manipulating the supply voltage provided to the integrated circuit to levels that are outside normal operating parameters. The manipulated supply voltage may cause circuitry in the integrated circuit to violate timing requirements, for example, causing a timing failure if the logic slow down caused by a reduced supply voltage is more than the reduction in the frequency of a clock signal. If security functions fail in response to the voltage tampering, security logic may be compromised, potentially allowing content to be stolen from a secure region of the integrated circuit.

DETAILED DESCRIPTION

Canary circuits and early versions of tunable replica circuits for voltage-delay monitoring typically present extensive calibration requirements prior to use, require a large number of fuses for tuning, and have challenging manual calibration specifications. These types of sensors may require complex critical-path delay-tuning or a manual alignment across PVT (process, voltage and temperature). Therefore, it would be desirable to provide fully-digital, compact, and intelligent sensors with reduced calibration requirements to enable silicon high-volume manufacturing (HVM).

According to some embodiments, an in-situ self-aligning, timing margin monitor (TMM) sensor circuit provides hardware-based security and timing margin reduction in an integrated circuit. The TMM sensor circuit can be used as a voltage and/or security detection circuit using auto-alignment functionality. The TMM sensor circuit enables continuous supply voltage droop/overshoot monitoring and provides a digital code of the sampled supply voltage every clock cycle, with the ability to track the supply voltage fluctuations in real-time. The TMM sensor circuit allows for threshold-based voltage attack detection, logging and recovery, and provides substantial benefits over existing on-die voltage sensing circuits. The TMM sensor circuit may, for example, be implemented with a small number of logic gate circuits (e.g., less than 750 logic gates), which reduces sensing area overhead. The TMM sensor circuit can be used for distributed sensing for many types of integrated circuits. The TMM sensor circuit can be implemented in both programmable logic and/or non-programmable logic circuitry.

According to some embodiments disclosed herein, a voltage attack in an integrated circuit die can be detected using a timing margin monitor (TMM) circuit that includes a tunable delay circuit, a time-to-digital converter circuit, and a control circuit that operates from the same supply voltage as the logic circuitry being monitored and protected. The tunable delay circuit delays a delayed signal relative to a divided clock signal. The tunable delay circuit receives the supply voltage. The control circuit causes adjustments to a delay provided by the tunable delay circuit to the delayed signal in response to an enable signal. The time-to-digital converter circuit generates a digital code based on the delayed signal that is proportional to the supply voltage in each clock cycle. In an aligned state, the control circuit compares the digital code to upper and lower threshold voltages in each clock cycle, and the results of the comparisons are used to generate droop and overshoot alarm signals. The control circuit asserts the droop alarm signal or the overshoot alarm signal when the supply voltage is outside a range defined by the upper and lower threshold voltages.

Figure 1:
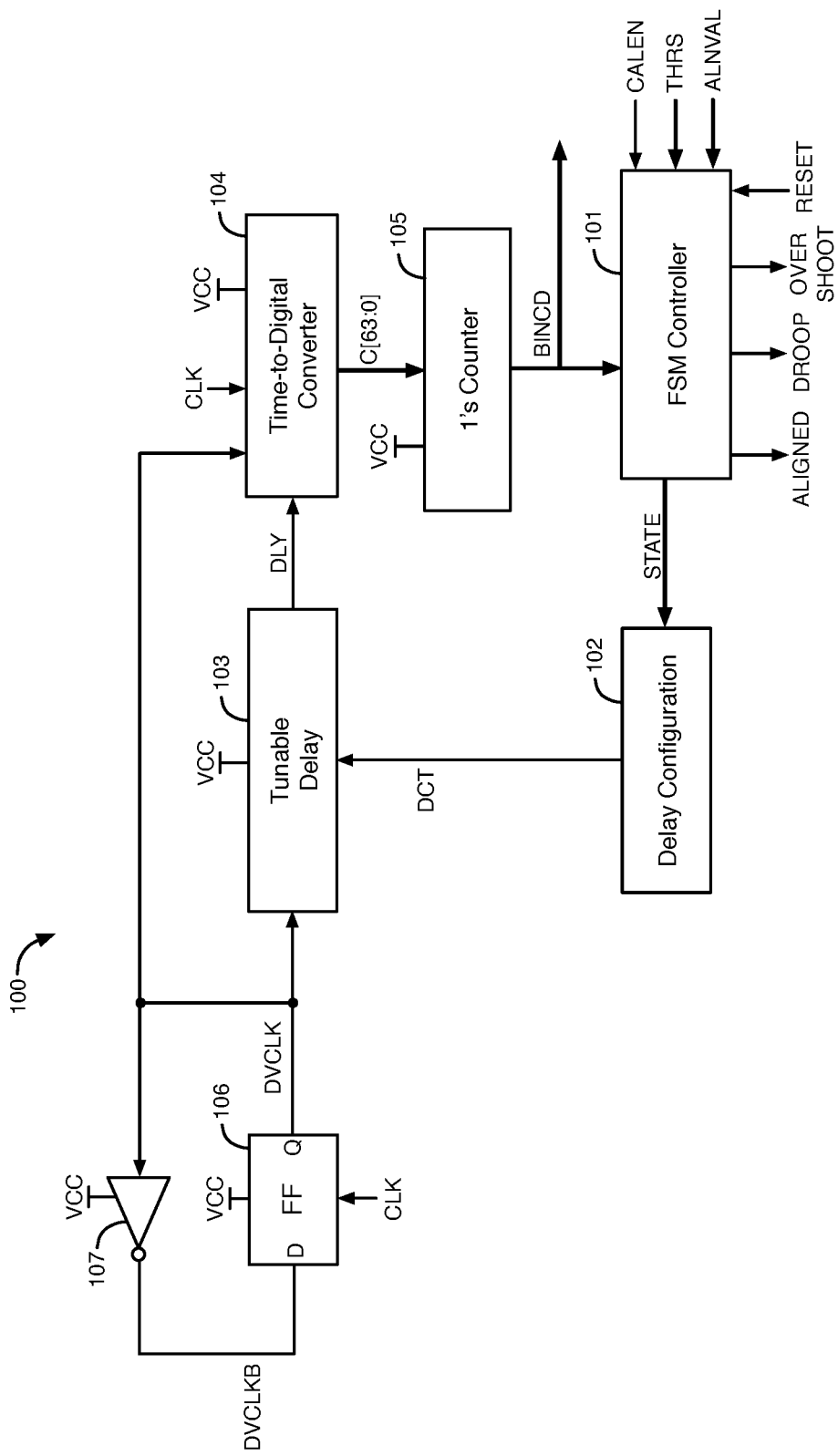
FIG. 1 illustrates an example of a timing margin monitor (TMM) circuit, according to an embodiment.

FIG. 1 illustrates an example of a timing margin monitor (TMM) circuit 100, according to an embodiment. TMM circuit 100 may also be referred to herein as a voltage detection circuit. As shown in FIG. (FIG.) 1, TMM circuit 100 includes finite state machine (FSM) controller circuit 101, delay configuration circuit 102, tunable delay circuit 103, time-to-digital converter (TDC) circuit 104, 1's counter circuit 105, flip-flop circuit 106, and inverter circuit 107. TMM circuit 100 may be formed in any type of integrated circuit (IC) die, such as a programmable logic IC (e.g., a field programmable gate array (FPGA)), a microprocessor IC, a graphics processing unit IC, a memory IC, or an application specific IC (ASIC). TMM circuit 100 can, for example, be synthesized as a system-in-package (SIP) using intrinsic FPGA primitives (e.g., programmable logic circuits) allowing for dynamic creation of on-die distributed sensing networks. The TMM circuit 100 can, for example, include hard intellectual property (IP) blocks, soft IP blocks, or a combination thereof, in an FPGA.

FSM controller circuit 101 and delay configuration circuit 102 function as a delay control circuit that controls the adjustable delay of tunable delay circuit 103, as described in detail below. As shown in FIG. 1, a reset signal RESET, a calibration enable signal CALEN, threshold control signals THRS, and signals ALNVAL are provided to inputs of finite state machine (FSM) controller circuit 101. Signals BINCD generated by 1's counter circuit 105 are provided to additional inputs of FSM controller circuit 101.

FSM controller circuit 101 generates output signals STATE that indicate the current state of a finite state machine (FSM) in the FSM controller circuit 101. FSM controller circuit 101 adjusts the current state of the FSM based on the input signals provided to FSM controller circuit 101, as described in further detail below with respect to FIGS. 3-4. The STATE signals are provided to inputs of delay configuration circuit 102. Delay configuration circuit 102 generates delay code tuning signals DCT based on the state of the FSM as indicated by the STATE signals. The delay code tuning signals DCT may include one or more signals (bits). Delay configuration circuit 102 may include an encoder that generates encoded delay code tuning signals DCT based on the state indicated by the STATE signals. The encoder may, as specific examples that are not intended to be limiting, encode the delay code tuning signals DCT as a binary code, a thermometer code, a Gray code, or a one-hot code.

The flip-flop (FF) circuit 106 and the inverter 107 are coupled together in a loop to form a clock divide-by-two frequency divider circuit. The output (Q) of FF circuit 106 couples to an input of inverter circuit 107, while an output of inverter circuit 107 couples to an input (D) of FF circuit 106. FF circuit 106 receives a supply voltage VCC. A periodic clock signal CLK is provided to a clock input of flip-flop (FF) circuit 106. Inverter circuit 107 inverts a divided clock signal DVCLK received at its input to generate an inverted divided clock signal DVCLKB at its output. The inverted divided clock signal DVCLKB is provided to the D input of FF circuit 106. FF circuit 106 generates the divided clock signal DVCLK at its Q output by capturing the value of inverted divided clock signal DVCLKB in response to clock signal CLK. The divided clock signal DVCLK has half the frequency of clock signal CLK.

The delay code tuning signals DCT are provided to control inputs of tunable delay circuit 103. The divided clock signal DVCLK is provided to another input of tunable delay circuit 103. Tunable delay circuit 103 is an adjustable delay circuit. Tunable delay circuit 103 generates a delayed periodic (clock) digital output signal DLY by delaying the rising and falling edges in the divided clock signal DVCLK. The delay that the tunable delay circuit 103 provides to the delayed output signal DLY relative to divided clock signal DVCLK is set based on the value of the delay code tuning signals DCT. Tunable delay circuit 103 adjusts the delay provided to delayed signal DLY relative to divided clock signal DVCLK based on changes in the value of the delay code tuning signals DCT. Tunable delay circuit 103 may, for example, include a delay chain of adjustable delay cells that are powered by the supply voltage VCC.

Tunable delay circuit 103 may, for example, be a replica circuit that replicates the delay in some other part of the same integrated circuit (IC). The tunable delay circuit 103 may, for example, replicate the delay in a data path in the IC and be in physical proximity to the data path. According to a more specific example, the data path that is replicated by delay circuit 103 may be the critical timing path in logic circuitry that is being monitored by TMM circuit 100. The logic circuitry, including the data path, receives the same supply voltage VCC as TMM circuit 100. The tunable delay circuit 103 may, for example, replicate the delay in the data path by containing the same types of logic gates coupled in the same order as the data path, or by using different types of logic gates that are selected to replicate the delay of the data path.

As shown in FIG. 1, the delayed signal DLY generated by tunable delay circuit 103 is provided to an input of time-to-digital converter (TDC) circuit 104. The divided clock signal DVCLK generated by FF circuit 106 and the clock signal CLK are provided to additional inputs of TDC circuit 104. TDC circuit 104 converts the delay that is provided by tunable delay circuit 103 to delayed signal DLY relative to divided clock signal DVCLK to a multi-bit digital thermometer output code C[63:0]. TDC circuit 104 changes the value of output code C[63:0] in response to each change that tunable delay circuit 103 makes to the delay of delayed signal DLY relative to divided clock signal DVCLK based on a change in signals DCT. TDC circuit 104 is also coupled to receive supply voltage VCC to monitor any anomalies in supply voltage VCC. Such anomalies may include droop in supply voltage VCC that is caused by a voltage attack. TDC circuit 104 changes the value of the digital thermometer code C[63:0] in proportion to changes in supply voltage VCC. For example, the value of code C[63:0] may decrease in each clock cycle of CLK in response to droop in supply voltage VCC.

Figure 2:
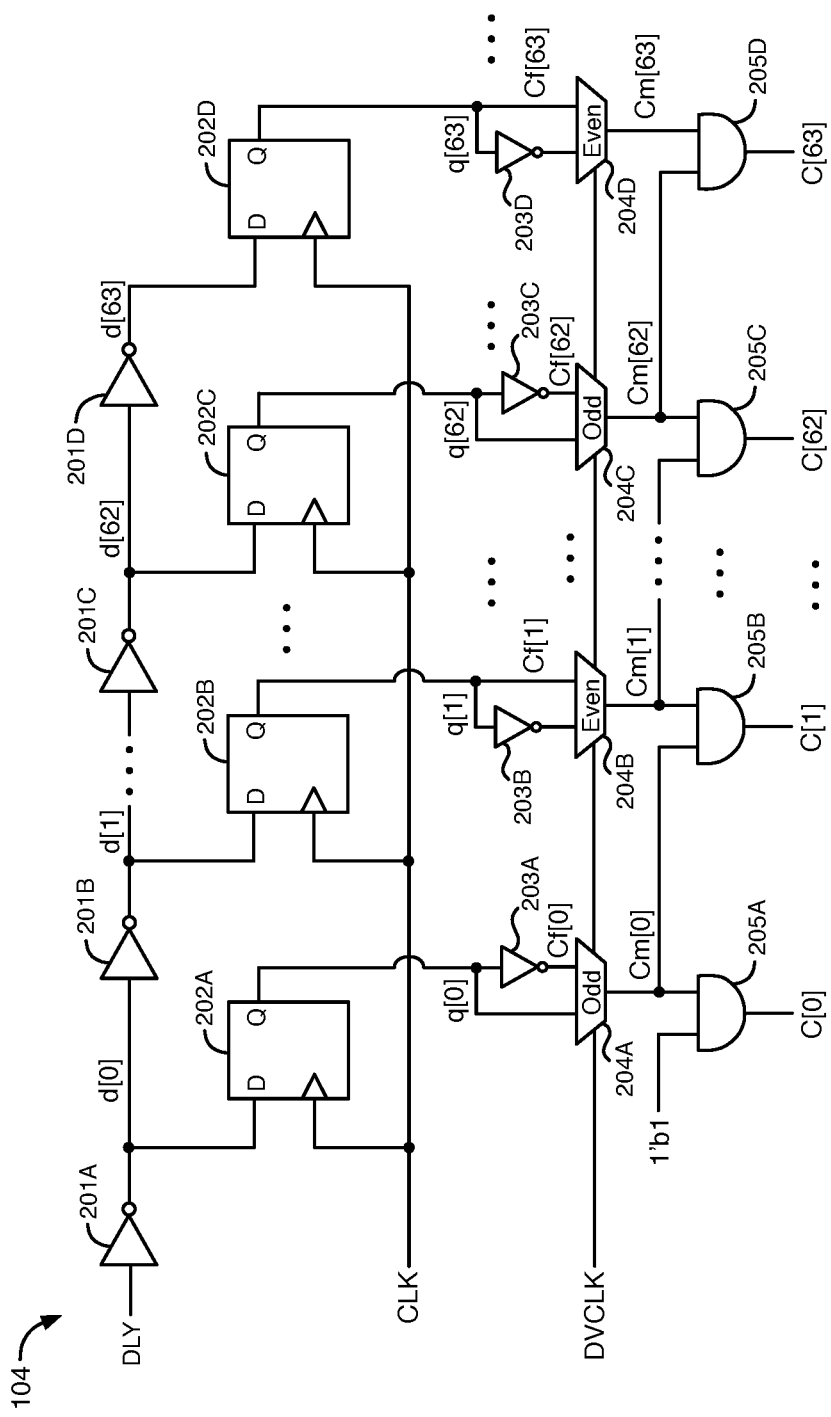
FIG. 2 illustrates details of an example of the time-to-digital converter (TDC) circuit of FIG. (FIG.) 1, according to an embodiment.

FIG. 2 illustrates details of an example of the time-to-digital converter (TDC) circuit 104 of FIG. 1, according to an embodiment. In the embodiment of FIG. 2, TDC circuit 104 includes 64 inverter circuits 201, 64 flip-flop circuits 202, 64 inverter circuits 203, 64 multiplexer circuits 204, and 64 logic AND gate circuits 205. In FIG. 2, inverter circuits 201A-201D, flip-flop circuits 202A-202D, inverter circuits 203A-203D, multiplexer circuits 204A-204D, and logic AND gate circuits 205A-205D are shown as examples. However, TDC circuit 104 may have any number (e.g., 16, 32, 48, 64, 128, etc.) of inverter circuits 201, flip-flop circuits 202, inverter circuits 203, multiplexer circuits 204, and logic AND gate circuits 205. In general, the number of flip-flop circuits 202, inverters 203, and multiplexers 204 is equal (or substantially equal) to the number of inverters 201.

The TDC circuit 104 includes a delay chain formed by the inverter circuits 201 that function as delay cells coupled in series. The input signal to the first inverter circuit 201A in the delay chain is the delayed signal DLY. Each of the inverter circuits 201 is coupled to receive supply voltage VCC. As such, the propagation delay of each inverter circuit 201 directly relates to the supply voltage VCC. As the supply voltage VCC decreases, the propagation delay of inverter circuits 201 increases. As the supply voltage VCC increases, the propagation delay of inverter circuits 201 decreases. The delay cells 201 can be any suitable digital or process-scalable delay cells. While an inverter is a simple form of an inversion delay cell, other circuits such as NAND gates, NOR gates, inverting multiplexers etc. can be configured and used as inversion delay cells. These inversion delay cells can be standard cells from a standard-cell library.

In various embodiments, flip-flop (FF) circuits 202 function as sequential circuits. Any suitable flip-flop design can be used for implementing FF circuits 202. The input D of each flip-flop circuit 202 couples to an output of one of inverter circuits 201. Each flip-flop circuit 202 receives the clock signal CLK at its clock input as a sampling clock signal. CLK has twice the frequency of the frequency divided clock signal DVCLK. One input of each multiplexer circuit 204 is coupled to receive an output signal q at a Q output of one of the FF circuits 202, as shown in FIG. 2. The 64 FF circuits 202 of FIG. 2 generate 64 output signals q[0], q[1], . . . q[62], and q[63]. Flip-flop circuits 202 sample the output signals of respective ones of the inverters 201 at their D inputs on every rising (or every falling) edge of clock signal CLK. For an odd cycle, the high-phase of the divided clock signal DVCLK passes through the delay chain 201, and for an even cycle, the low-phase of the divided clock signal DVCLK passes through the delay chain 201. To generate consistent output codes every cycle of clock signal CLK, regardless of the phase of clock signal DVCLK passed to the delay chain 201, TDC circuit 104 uses polarity inversion of an output code C every other clock cycle. In some embodiments, multiplexer circuits 204 controlled by divided clock signal DVCLK at their select inputs implement polarity inversion of the code C every other clock cycle.

Inverter circuits 203 may be simple inverters or any other digital inversion logic such as NAND gates, NOR gates, etc. configured as inverters. Each of the multiplexer circuits 204 is controllable by clock signal DVCLK at its select input. For example, when DVCLK is high, the signal at the multiplexer 204 data input '1' is provided as output Cm, and when DVCLK is low, the signal at the multiplexer 204 input '0' is provided as output Cm. Each of the multiplexer circuits 204 receives alternating signals at its '0' and '1' inputs from the respective inverter 203 and from the respective flip-flop 202. For example, the first multiplexer 204A receives signal Cf[0] (which is an inversion of signal q[0]) from inverter 203A at its input '0' and signal q[0] (which is logically equivalent to the inversion of Cf[0]) at its input '1'. The second multiplexer circuit 204B receives signal Cf[1] (which is equivalent to signal q[1]) at its input '0' and an inversion of signal q[1] (which is logically equivalent to the inversion of signal Cf[1]) at its input '1'. Clock signal DVCLK causes multiplexers 204 to select signals Cf[63:0] as output signals Cm[63:0] when DVCLK is 0, and the inversions of signals Cf[63:0] as output signals Cm[63:0] when DVCLK is 1. The multiplexers 204 and the inverters 203 cause the output code Cm[63:0] to be a thermometer code.

AND logic gate circuits 205 function as bubble suppression circuitry in TDC circuit 104. The inputs of each AND logic gate circuit 205 receive the output signal Cm of one or two of the multiplexers 204, as shown in FIG. 2. The first AND logic gate circuit 205A receives a hard-wired logic '1' value at its first input and signal Cm[0] at its second input. The second AND logic gate circuit 205B receives signal Cm[0] at its first input and signal Cm[1] at its second input, and so on. As such, any flip-flop metastability-induced bubble in the code Cm[0] through Cm[63], is suppressed by bubble suppression logic gates 205. While AND logic gates 205 are shown in FIG. 2, the AND logic gate circuits 205 can be implemented as NAND logic gates. In the example of FIG. 2, TDC circuit 104 has 64 AND logic gate circuits 205, which is the same number of the delay cells 201. The AND logic gate circuits 205 generate an output thermometer code C[63:0] that is transmitted on parallel signal lines (i.e., a 64-bit code).

TDC circuit 104 has a fast response time of one clock cycle latency by passing a pulse of DVCLK every clock cycle and inverting the polarity of the intermediate code (e.g., Cf[63:0]) every other clock cycle using multiplexers 204 and inverters 203. TDC circuit 104 is accurate by sampling the supply voltage VCC for a full clock cycle, providing improved droop detection resolution. TDC circuit 104 generates code C[63:0] with a 1 clock cycle latency (rather than 2 clock cycles), effectively doubling the throughput of the sensor compared to traditional TDCs that require an implicit reset cycle between consecutive samples.

Referring again to FIG. 1, the output thermometer code C[63:0] generated by TDC circuit 104 is transmitted to inputs of 1's counter circuit 105. 1's counter circuit 105 may be, for example, an adder circuit. 1's counter circuit 105 converts the thermometer code C[63:0] to a binary code BINCD at its outputs. 1's counter circuit 105 causes the binary value of binary code BINCD to equal the number of is in thermometer code C[63:0]. The binary code BINCD is provided to inputs of FSM controller circuit 101 and to outputs of TMM circuit 100.

Figure 3:
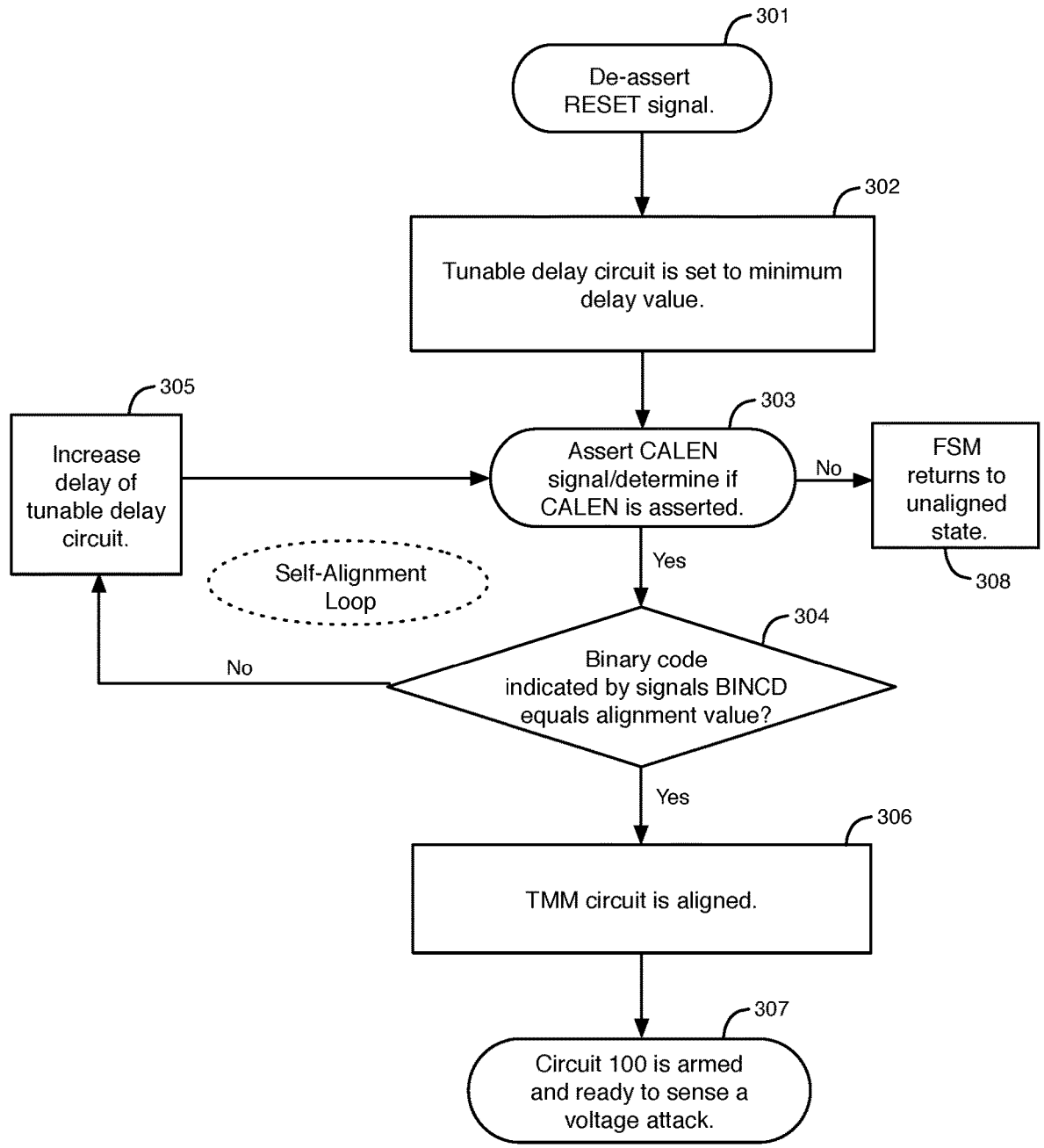
FIG. 3 is a flow chart that illustrates examples of operations that the TMM circuit of FIG. 1 may perform to monitor the supply voltage, according to an embodiment.
Figure 4:
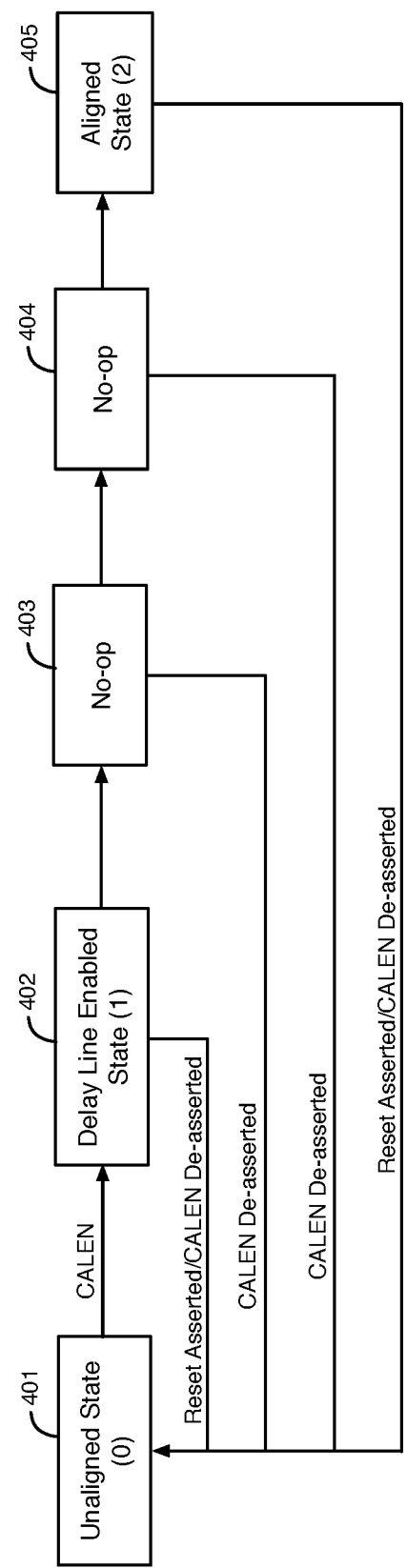
FIG. 4 is a state diagram that illustrates the states of a finite state machine (FSM) in the FSM controller circuit of FIG. 1 and the progression between the states, according to an embodiment.

Further details of an example of the operation of the TMM circuit 100 are now discussed in the context of FIGS. 1, 3, and 4. Timing margin monitor (TMM) circuit 100 detects a change in the supply voltage VCC above an upper threshold voltage or below a lower threshold voltage. The upper and lower threshold voltages are defined by the threshold control signals THRS. FIG. 3 is a flow chart that illustrates examples of operations that the TMM circuit 100 may perform to monitor the supply voltage VCC, according to an embodiment. FIG. 4 is a state diagram that illustrates the states of a finite state machine (FSM) in the FSM controller circuit 101 and the progression between the states, according to an embodiment.

The supply voltage detection process disclosed herein with respect to FIGS. 3-4 is ideally performed during quiescent conditions of the IC when the supply voltage VCC is stable (e.g., after reset and before workload execution in the IC). Performing supply voltage detection during quiescent conditions ensures that consistent values are determined for the binary code indicated by signals BINCD.

In an exemplary embodiment of TMM circuit 100, circuits 101-102 initially set tunable delay circuit 103 to its minimum delay value and then increase the delay of tunable delay circuit 103. The minimum delay value of tunable delay circuit 103 is the minimum delay that circuit 103 can provide to delayed signal DLY relative to divided clock signal DVCLK.

Referring to FIGS. 1 and 4, the RESET signal is initially asserted, and the CALEN signal is initially de-asserted, causing the FSM controller circuit 101 to be in an unaligned state (0) 401 (shown in FIG. 4) and in reset. In operation 301 shown in FIG. 3, the RESET signal is de-asserted (e.g., transitions to a logic low state). In response to the RESET signal being de-asserted, FSM controller circuit 101 is no longer in reset. In operation 302 shown in FIG. 3, FSM controller circuit 101 and delay configuration circuit 102 set the tunable delay circuit 103 to its minimum delay value. TDC circuit 104 may, for example, generate all is in thermometer code C[63:0] in response to the minimum delay value of tunable delay circuit 103. Also, FSM controller circuit 101 receives the threshold control signals THRS that indicate the values of the upper and lower threshold voltages, and FSM controller circuit 101 receives ALNVAL signals. Signals ALNVAL indicate an alignment value for the binary code indicated by signals BINCD. The ALNVAL signals may, for example, be provided as an N-bit binary code. The alignment value indicated by signals ALNVAL may equal any of the possible values of the BINCD signals. The threshold control signals THRS may, for example, be generated based on user input or retrieved from storage.

In operation 303 shown in FIG. 3, the CALEN signal is asserted (e.g., transitions to a logic high state). In response to the CALEN signal being asserted, the FSM controller circuit 101 transitions from the unaligned state 401 to the delay line enabled state (1) 402, as shown in FIG. 4. In operation 303, the FSM controller circuit 101 adjusts the value of the STATE signals to indicate to delay configuration circuit 102 that the FSM is in the delay line enabled state 402. In the delay line enabled state 402, FSM controller circuit 101 and delay configuration circuit 102 perform a self-alignment loop to calibrate the delay of tunable delay circuit 103, as shown in FIG. 3.

In decision operation 304 shown in FIG. 3, FSM controller circuit 101 determines if the binary code indicated by signals BINCD equals the alignment value indicated by signals ALNVAL. As an example, FSM controller circuit 101 may include a comparator circuit that compares the binary code indicated by signals BINCD to the alignment value indicated by signals ALNVAL to determine if these two values are equal in operation 304. If FSM controller circuit 101 determines that the binary code indicated by signals BINCD does not equal the alignment value indicated by signals ALNVAL in decision operation 304, FSM controller circuit 101 and delay configuration circuit 102 increase the delay that the tunable delay circuit 103 provides to signal DLY relative to divided clock signal DVCLK, in operation 305 shown in FIG. 3. As an example, the delay configuration circuit 102 may adjust the value of the delay code tuning signals DCT in operation 305 in response to the STATE signals indicating that the finite state machine (FSM) is in the delay line enabled state 402. In response to the adjustment in the value of the delay code tuning signals DCT provided by delay configuration circuit 102 in operation 305, tunable delay circuit 103 increases the delay provided to signal DLY relative to clock signal DVCLK. As a more specific example, the delay configuration circuit 102 may contain a counter circuit that increases a count value in operation 305 in response to the STATE signals indicating that the FSM is in the delay line enabled state 402. In this example, the delay configuration circuit 102 may provide the count value in the delay code tuning signals DCT.

During the self-alignment loop of FIG. 3, the FSM controller circuit 101 continuously, or at intervals, determines if the CALEN signal is still asserted in operation 303. If the CALEN signal is de-asserted, or if the RESET signal is asserted, during the self-alignment loop, the FSM in FSM controller circuit 101 returns to the unaligned state 401 in operation 308, and the self-alignment loop terminates.

Also, during the self-alignment loop, the FSM controller circuit 101 continuously, or at intervals, determines in decision operation 304 if the binary code indicated by signals BINCD equals the alignment value indicated by signals ALNVAL. As long as the binary code indicated by signals BINCD does not equal the alignment value indicated by signals ALNVAL, the FSM in FSM controller circuit 101 remains in state 402, and the delay configuration circuit 102 continues to increase the delay that the tunable delay circuit 103 provides to signal DLY relative to divided clock signal DVCLK in additional iterations of operation 305.

In response to each increase that tunable delay circuit 103 provides to the delay of signal DLY relative to divided clock signal DVCLK, TDC circuit 104 decreases the number of 1s in thermometer code C[63:0], and 1's counter circuit 105 decreases the binary value of signals BINCD. As the delay provided to signal DLY increases, the period of clock signal CLK remains constant, if there are no changes in the supply voltage VCC and the temperature of the IC. After FSM controller circuit 101 has detected that the binary value of signals BINCD equals the alignment value indicated by signals ALNVAL in operation 304, FSM controller circuit 101 and delay configuration circuit 102 maintain the value of the delay code tuning signals DCT constant. In response to the value of signals DCT being constant, tunable delay circuit 103 causes the delay provided to signal DLY to remain constant. In response to the delay provided to signal DLY remaining constant, TDC 104 and 1's counter circuit 105 cause the binary value of signals BINCD to remain constant.

In response to FSM controller circuit 101 determining that the binary value indicated by signals BINCD equals the alignment value indicated by signals ALNVAL, FSM controller circuit 101 transitions from the delay line enabled state 402 to the aligned state 405. During the transition to the aligned state 405, FSM controller circuit 101 performs 2 NO-OPs (no operations) 403-404 as a filter for any combinational glitches from tunable delay circuit 103 and to prevent any false positives in the circuitry of FIG. 1 after the self-alignment loop. After the tunable delay circuit 103 has settled after the 2 NO-OPs 403-404, FSM controller circuit 101 enters the aligned state 405 in operation 306 indicating that TMM circuit 100 is aligned, and FSM controller circuit 101 asserts an ALIGNED output signal indicating the alignment of TMM circuit 100, as shown in FIG. 1. In the aligned state 405, FSM controller circuit 101 outputs a value in the STATE signals that indicates that TMM circuit 100 is ready for use.

TMM circuit 100 returns to the unaligned state 401 in response to the CALEN signal being de-asserted or the RESET signal being asserted, as shown in FIG. 4. If PVT (process, voltage and temperature) conditions change in the IC (e.g. supply voltage VCC changes), the FSM controller circuit 101 and TDC circuit 104 quickly re-align to a new supply voltage VCC by toggling the CALEN signal, and voltage fluctuations around the new supply voltage VCC are monitored. The minimum and maximum threshold voltages indicated by threshold control signals THRS can be adjusted accordingly.

Figure 5:
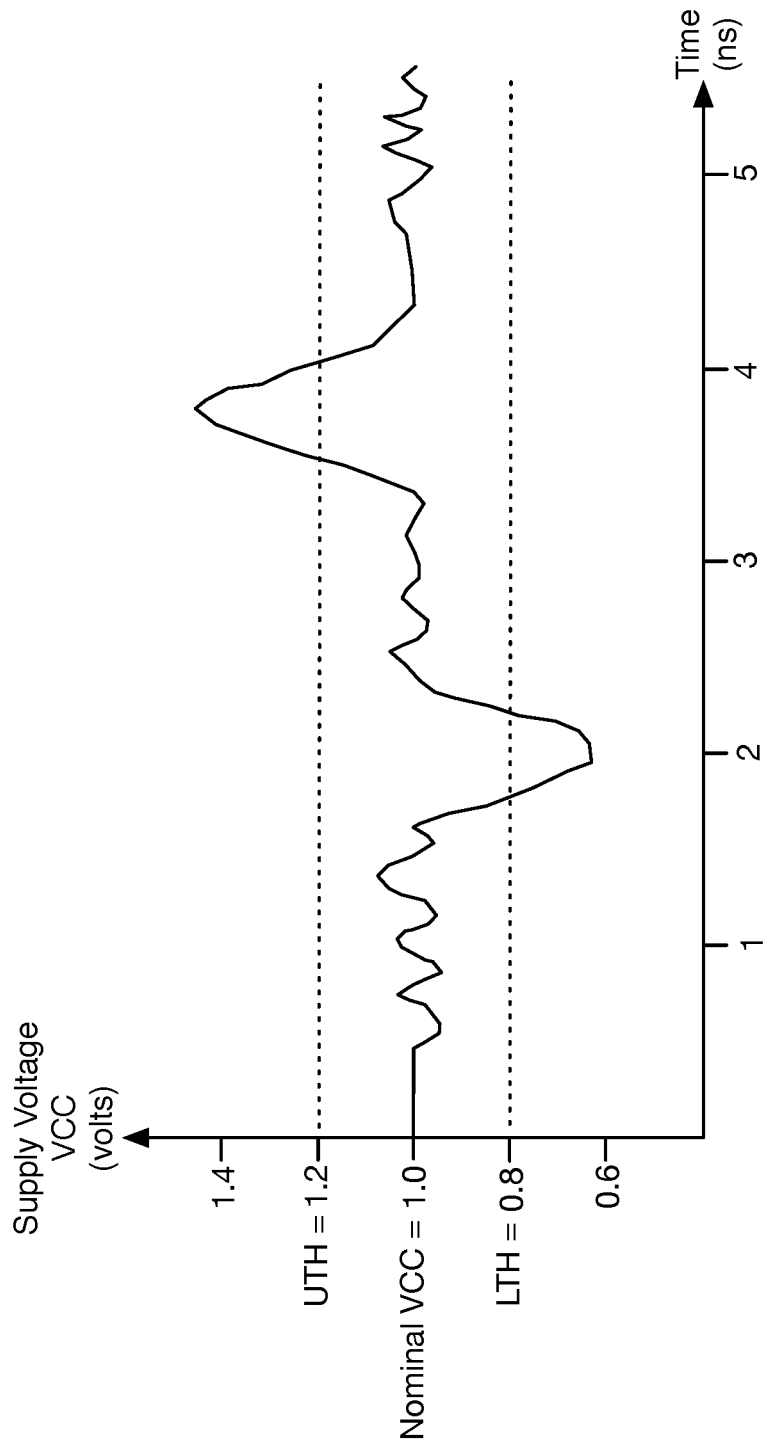
FIG. 5 illustrates an example of how the supply voltage can vary relative to upper and lower threshold voltages in the aligned state, according to an embodiment.

In the aligned state 405, TMM circuit 100 can detect variations in the supply voltage VCC that are outside a voltage range defined by threshold control signals THRS. TMM circuit 100 can detect an overshoot in the supply voltage VCC and an undershoot in the supply voltage VCC in the aligned state 405. The threshold control signals THRS provided to FSM controller circuit 101 indicate an upper threshold voltage UTH and a lower threshold voltage LTH that define the voltage range. The upper threshold voltage UTH corresponds to a binary value that is greater than the alignment value indicated by signals ALNVAL. The lower threshold voltage LTH corresponds to a binary value that is less than the alignment value ALNVAL. In the aligned state 405, one or more comparator circuits in FSM controller circuit 101 compare the binary code indicated by signals BINCD to the binary values of the upper threshold voltage UTH and the lower threshold voltage LTH indicated by control signals THRS. In the aligned state 405, FSM controller circuit 101 asserts an OVERSHOOT signal in response to supply voltage VCC (as indicated by signals BINCD) increasing above the upper threshold voltage UTH. In the aligned state 405, FSM controller circuit 101 asserts a DROOP signal in response to supply voltage VCC (as indicated by signals BINCD) decreasing below the lower threshold voltage LTH. FIG. 5 illustrates an example of how the supply voltage VCC can vary relative to the upper threshold voltage UTH and the lower threshold voltage LTH in the aligned state 405, according to an embodiment. In the example of FIG. 5, the upper threshold voltage UTH is 1.2 volts, the nominal supply voltage VCC is 1.0 volts, and the lower threshold voltage LTH is 0.8 volts. Time is shown in nanoseconds (ns).

When the supply voltage VCC moves outside the voltage range defined by the upper and lower threshold voltages UTH and LTH, the delay of tunable delay circuit 103 has increased or decreased by an amount sufficient to exceed a timing margin. When TMM circuit 100 is operating in the aligned state 405, the change in the binary value of signals BINCD that is caused by VCC moving outside the voltage range functions as an alarm that indicates to FSM controller circuit 101 (and possibly other circuitry in the IC) that a voltage attack on the supply voltage VCC may have occurred in the IC. In an embodiment, TMM circuit 100 may generate the alarm in the OVERSHOOT signal or in the DROOP signal quickly, for example, within 1 clock cycle (of CLK) of the timing margin being exceeded. The binary code indicated by signals BINCD indicates the extent of the timing violation (or available slack) for margin recovery.

The digital code indicated by the delay code tuning signals DCT at the alignment value is dependent on the process, the voltage, and the temperature (PVT) of the IC. For this reason, the digital code indicated by the delay code tuning signals DCT at the alignment value is a valuable reference point for security uses, such as power optimization and energy recovery using dynamic voltage-frequency scaling. When a TMM circuit 100 is embedded inside an integrated circuit (IC) die, the tunable delay circuit 103 tracks the PVT conditions of the IC during operation of the IC. Transient voltage and temperature changes in the IC, if any, may be indicated by changes in the delay of tunable delay circuit 103. Multiple instances of TMM circuit 100 can be created to implement a network of compact voltage sensors in an IC to diagnose the conditions of the supply voltage power grid in the IC, to indicate voltage faults in the IC, and to flag voltage attacks on the IC for making the IC more secure. TMM circuit 100 can also be used to maximize the supply voltage VCC, for dynamic timing margin and energy reduction, and to improve silicon energy efficiency in a dynamic, workload dependent manner. In some embodiments, the delay code tuning signals DCT can be used to sort integrated circuit dies after fabrication based on their speed using frequency driven silicon binning.

The self-alignment loop in operations 303-305 enables a compact, low-power TMM sensor circuit 100 that has a short TDC chain (e.g. 16-bit or 64-bit TDC circuit) and that saves valuable clock power compared to previously known TDC designs. TMM 100 eliminates the need to overprovision the TDC with bits that are unneeded for the self-alignment loop. The self-alignment loop allows the TDC 104 to monitor transitions around the alignment value that are useful for a variety of purposes, such as supply voltage detection and timing monitoring.

According to some embodiments, processing circuitry can process the data indicated by the binary code BINCD in real-time using pattern recognition with signal template matching to identify patterns in the data that indicate anomalies in the supply voltage on a power grid in the integrated circuit. The processing circuitry can attempt to pattern match the data indicated by code BINCD with known signal templates to determine if the supply voltage contains any anomalies.

According to other embodiments, the time-to-digital converter (TDC) circuit 104 partitions the digital code C[63:0] into multiple segments (e.g., 4 code segments each having 16-bits). The FSM controller circuit 101 and the delay configuration circuit 102 can align any of the segments of the digital code C[63:0] to the alignment value indicated by signals ALNVAL.

In addition to being used for hardware security, the TMM circuit 100 can also be used for timing margin detection. After auto-alignment and calibration of TMM circuit 100, fluctuations in the output digital code BINCD are PVT dependent and provide a reference point for security uses, power optimization, timing margin detection, and energy recovery using dynamic voltage-frequency scaling (DVFS) and silicon binning. When a distributed sensing network of TMM circuits 100 is embedded inside an integrated circuit (IC), the tunable delay circuit 103 tracks PVT conditions in the IC during operation. Transient voltage and temperature changes, if any, are reflected in the output signal DLY of tunable delay circuit 103 and in signals BINCD. The resulting magnitude of signals BINCD indicate if there are positive or negative supply voltage or timing margin changes and serves as an indicator of the extent of a timing violation (or available slack) for timing margin recovery related to clock signal DVCLK. After alignment to a clock edge, the code indicated by signals BINCD is indicative of the timing of the leading and trailing edges of the divided clock signal DVCLK and can be used for closed-loop power and timing management (e.g., using an on-board or on-die power management unit) for the detection of supply voltage and timing margin changes.

Figure 6:
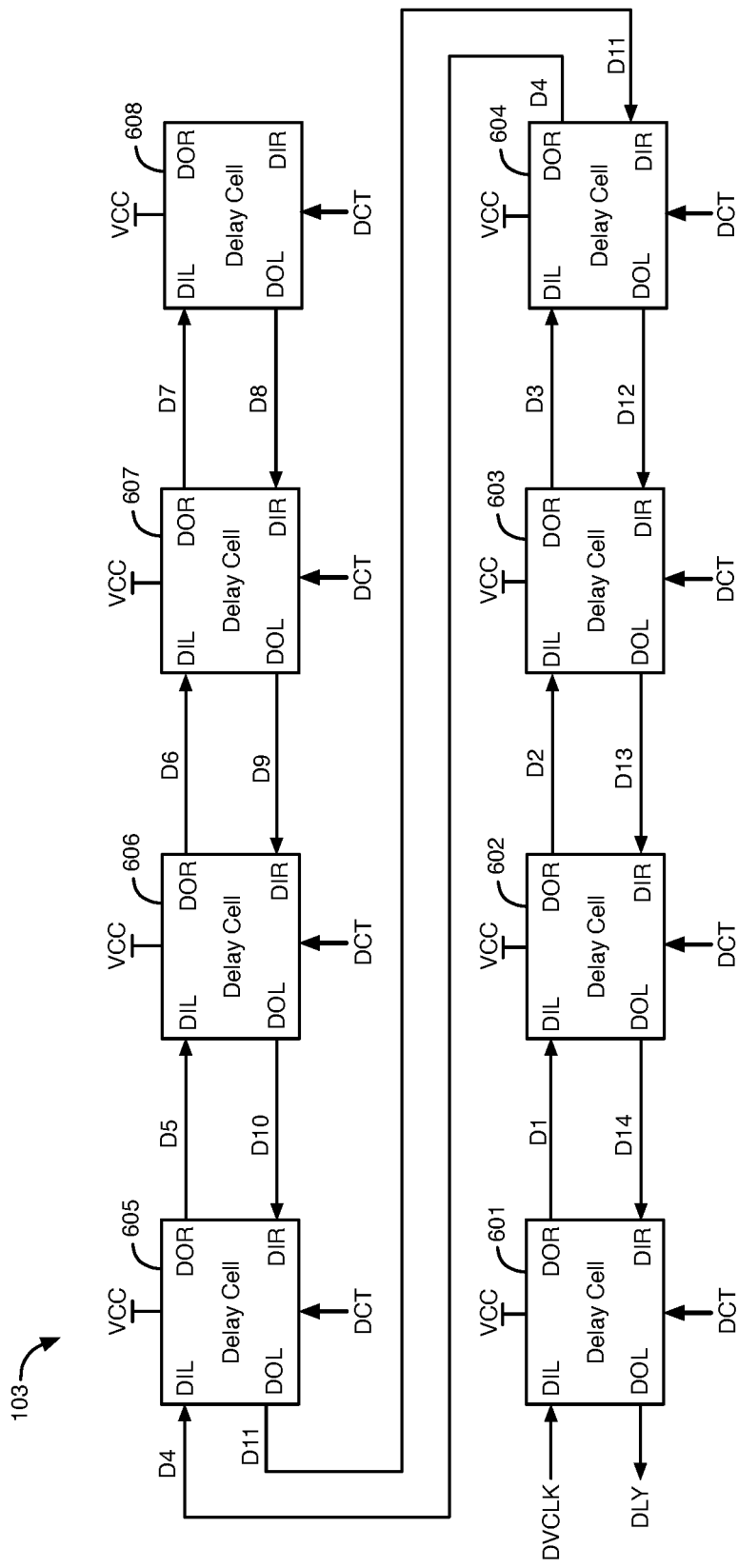
FIG. 6 illustrates an example of the tunable delay circuit of FIG. 1, according to an embodiment.
Figure 7:
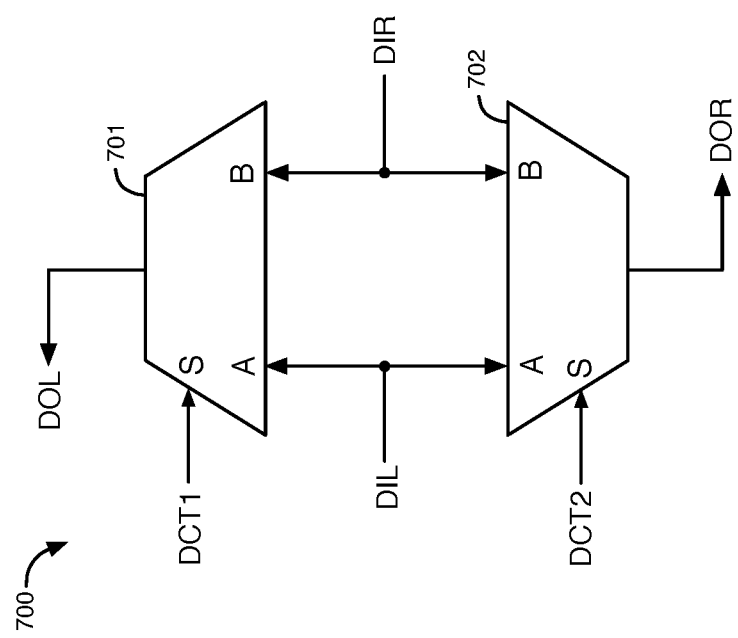
FIG. 7 illustrates an example of a delay cell circuit, according to an embodiment.

A detailed example of the tunable delay circuit 103 in TMM circuit 100 is disclosed herein with respect to FIGS. 6 and 7. The exemplary tunable delay circuit 103 shown in FIGS. 6-7 is provided for illustrative purposes and is not intended to be limiting. Many other types of adjustable delay circuits may be used to implement the tunable delay circuit 103 of FIG. 1.

FIG. 6 illustrates an example of the tunable delay circuit 103 of FIG. 1, according to an embodiment. In the exemplary embodiment of FIG. 6, tunable delay circuit 103 is an adjustable replica delay chain circuit. The tunable delay circuit 103 of FIG. 6 is a symmetric and linearized delay circuit that includes a bi-directional, folded, telescopic delay chain of adjustable delay cell circuits. In the embodiment of FIG. 6, tunable delay circuit 103 includes 8 delay cell circuits 601-608 coupled in a folded, bidirectional delay chain configuration. Although 8 delay cell circuits 601-608 are shown in the example of FIG. 6, it should be understood that tunable delay circuit 103 of FIG. 1 can have any number of delay cell circuits needed to match any specific latency requirements.

As another specific example, tunable delay circuit 103 may have 53 delay cell circuits that are coupled in a bidirectional, folded delay chain, as with the embodiment of FIG. 6. In some embodiments, the delay cell circuits 601-608 are fully synthesizable and can be built using native standard library cells on any process node. A faster delay cell circuit allows for a finer resolution in capturing voltage changes. Each of the delay cell circuits in tunable delay circuit 103 receives the same supply voltage VCC, as shown in FIG. 6.

In the embodiment of FIG. 6, the divided clock signal DVCLK is provided to an input of delay cell circuit 601, and the delayed output signal DLY is generated at an output of delay cell circuit 601. Each of the delay cell circuits 601-608 has a data-forward circuit and a data-return circuit that are controlled by the delay code tuning signals DCT generated by the delay configuration circuit 102 of FIG. 1. One or more of the data-forward circuits in the delay cell circuits 601-608 propagate the rising and falling edges received in the DVCLK signal along a first delay path through the delay chain. One or more of the data-return circuits in the delay cell circuits 601-608 propagate the rising and falling edges received from the last data-forward circuit coupled in the delay chain along a second delay path through the delay chain to the output in signal DLY.

The digital code of the delay code tuning signals DCT determines how many of the delay cell circuits 601-608 are coupled in the delay chain that propagates rising and falling edges received from clock signal DVCLK to the output in signal DLY. The delay configuration circuit 102 adjusts the value of the delay code tuning signals DCT to couple more or less of the delay cell circuits 601-608 into the delay chain that couples the input at clock signal DVCLK to the output at signal DLY. For example, an increase in the value of the delay code tuning signals DCT may cause delay circuit 103 to couple more of delay cell circuits 601-608 into the delay chain, increasing the delay provided to signal DLY relative to clock signal DVCLK. As another example, a decrease in the value of the delay code tuning signals DCT may cause delay circuit 103 to couple fewer of the delay cell circuits 601-608 into the delay chain, decreasing the delay provided to signal DLY relative to clock signal DVCLK.

The value of the delay code tuning signals DCT determines the last delay cell circuit coupled in the delay chain. The last delay cell circuit coupled in the delay chain passes the delayed signal in the first delay path to the second delay path through its data-forward and data-return circuits, decoupling subsequent delay cell circuits from the delay chain, as discussed in further detail below.

The tunable delay circuit 103 of FIG. 6 has 8 possible delay settings that are configured by the delay code tuning signals DCT. When signals DCT configure tunable delay circuit 103 to have the minimum delay setting, delay cell circuit 601 is the only delay cell circuit coupled in the delay chain, and transitions in clock signal DVCLK propagate through the data-forward and data-return circuits in delay cell circuit 601 back to the output as delayed signal DLY without passing through any of the other delay cell circuits 602-608.

When signals DCT configure tunable delay circuit 103 to have the second smallest delay setting, delay cell circuits 601 and 602 are the only delay cell circuits coupled in the delay chain. With the second smallest delay setting, transitions in clock signal DVCLK propagate through the data-forward circuit in delay cell circuit 601, then to delay cell circuit 602 as signal D1, then through the data-forward and data-return circuits in delay cell circuit 602, then back to delay cell circuit 601 as signal D14, and then through the data-return circuit in delay cell circuit 601 to the output as signal DLY.

When signals DCT configure tunable delay circuit 103 to have the third smallest delay setting, delay cell circuits 601-603 are the only delay cell circuits coupled in the delay chain. With the third smallest delay setting, transitions in clock signal DVCLK propagate through the data-forward circuit in delay cell circuit 601, then to delay cell circuit 602 as signal D1, then through the data-forward circuit in delay cell circuit 602, then to delay cell circuit 603 as signal D2, then through the data-forward and data-return circuits in delay cell circuit 603, then back to delay cell circuit 602 as signal D13, then through the data-return circuit in delay cell circuit 602, then back to delay cell circuit 601 as signal D14, and finally through the data-return circuit in delay cell circuit 601 to the output as signal DLY.

When signals DCT configure tunable delay circuit 103 to have the maximum delay setting, all 8 of the delay cell circuits 601-608 are coupled in the delay chain. With the maximum delay setting, transitions in clock signal DVCLK propagate through the data-forward circuits in delay cell circuits 601-607 to signal D7, passing between the delay cell circuits as signals D1-D7 along the first delay path, as shown in FIG. 6. The transitions in signal D7 then propagate through the data-forward and data-return circuits in delay cell circuit 608 to signal D8. The transitions in signal D8 then propagate back through the data-return circuits in delay cell circuits 607, 606, 605, 604, 603, 602, and 601 to delayed signal DLY, passing between the delay cell circuits as signals D8-D14 along the second delay path, as shown in FIG. 6.

FIG. 7 illustrates an example of a delay cell circuit 700, according to an embodiment. Delay cell circuit 700 of FIG. 7 is an example of each of the delay cell circuits 601-608 in the tunable delay circuit 103 of FIG. 6. Delay cell circuit 700 includes two 2-to-1 multiplexer circuits 701 and 702. The A data input of each of the multiplexer circuits 701-702 is coupled to the left input DIL of delay cell circuit 700. The B data input of each of the multiplexer circuits 701-702 is coupled to the right input DIR of the delay cell circuit 700. The output of multiplexer circuit 701 is coupled to the left output DOL of the delay cell circuit 700. The output of multiplexer circuit 702 is coupled to the right output DOR of the delay cell circuit 700. The inputs DIL and DIR and the outputs DOR and DOL of each of the delay cell circuits 601-608 shown in FIG. 6 correspond to the DIL and DIR inputs and the DOR and DOL outputs of delay cell circuit 700, respectively. The select input S of multiplexer circuit 701 is coupled to receive a first one DCT1 of the delay code tuning signals DCT. The select input S of multiplexer circuit 702 is coupled to receive a second one DCT2 of the delay code tuning signals DCT.

In order to configure the delay cell circuit 700 to be the last delay cell circuit coupled in the delay chain, the delay code tuning signal DCT1 is set to a logic state that causes multiplexer circuit 701 to pass the signal transitions received at input DIL to output DOL. For example, as described above, delay cell circuit 608 is the last delay cell circuit coupled in the delay chain when tunable delay circuit 103 has the maximum delay setting, and delay cell circuit 601 is the last delay cell circuit coupled in the delay chain when tunable delay circuit 103 has the minimum delay setting.

In order to configure the delay cell circuit 700 to be one of the delay cell circuits coupled in the delay chain other than the last delay cell circuit coupled in the delay chain, the delay code tuning signal DCT2 is set to a logic state that causes multiplexer 702 to pass the signal transitions received at input DIL to output DOR, and the delay code tuning signal DCT1 is set to a logic state that causes multiplexer 701 to pass the signal transitions received at input DIR to output DOL. When delay cell circuit 700 is in this configuration, multiplexer 702 is the data-forward circuit, and multiplexer 701 is the data-return circuit. Thus, delay cell circuit 700 is configurable to implement each of the delay cell circuits 601-608 of FIG. 6 for each of the 8 configurable delay settings of tunable delay circuit 103.

Figure 8:
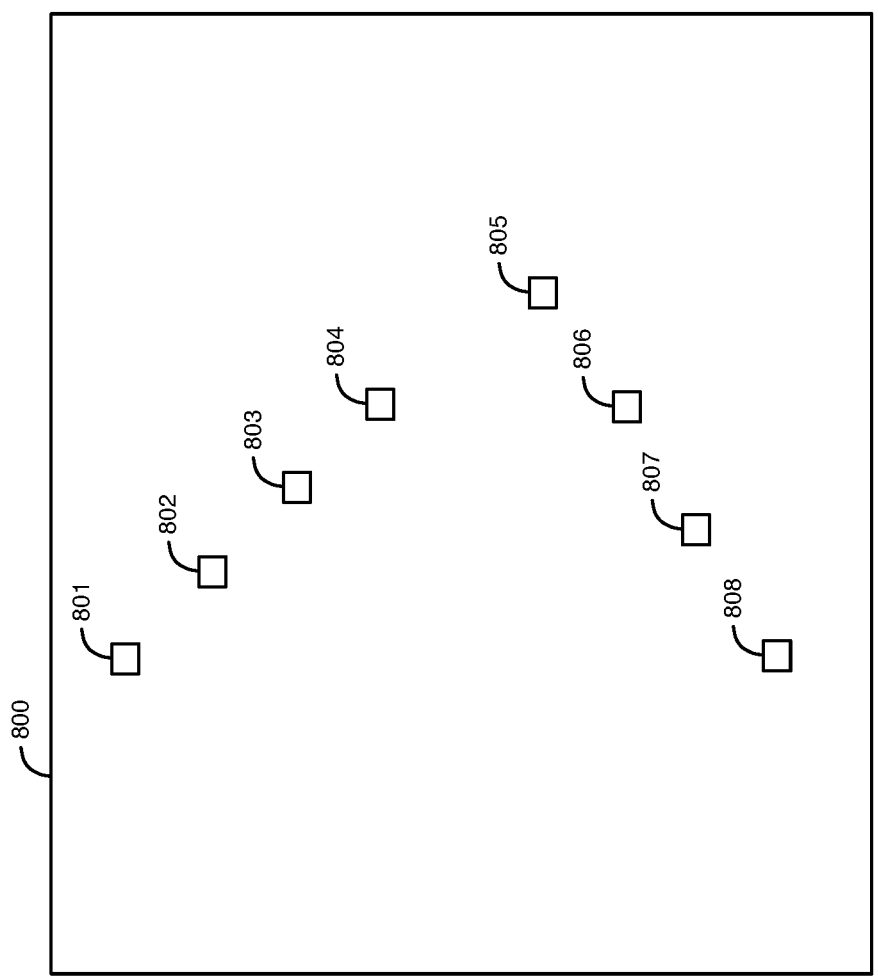
FIG. 8 illustrates a top down view of an example of a portion of an integrated circuit (IC) die that includes TMM circuits, according to an embodiment.

FIG. 8 illustrates a top down view of an example of a portion 800 of an integrated circuit (IC) die that includes TMM circuits, according to an embodiment. Portion 800 of the IC die includes 8 TMM circuits 801-808 in the example of FIG. 8. In other embodiments, an IC die may have any number of TMM circuits. TMM circuit 100 of FIG. 1 is an example of each of the 8 TMM circuits 801-808. TMM circuits 801-808 detect voltage attacks on one or more supply voltages in the IC and indicate the occurrence of a voltage attack in the OVERSHOOT and DROOP signals as described above with respect to FIGS. 1-7, before the voltage attack leads to a timing failure that may compromise security functions in the IC die. TMM circuits 801-808 may also detect changes in the supply voltage that occur for other reasons and changes in the temperature of the IC die.

Figure 9:
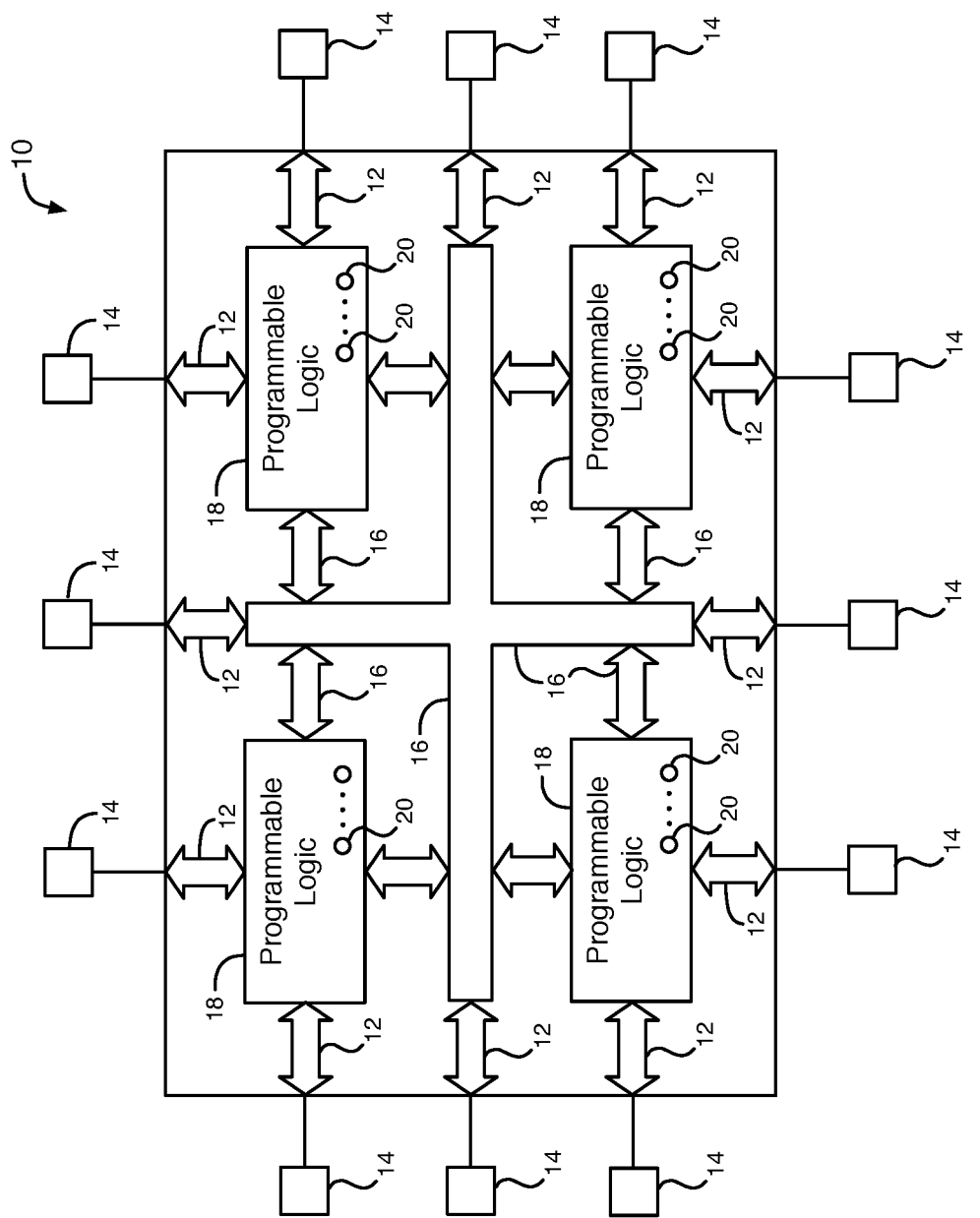
FIG. 9 is a diagram of an illustrative programmable integrated circuit in accordance with an embodiment.

An illustrative programmable logic integrated circuit (IC) 10 that may include one or more TMM circuits 100 is shown in FIG. 9. As shown in FIG. 9, programmable logic integrated circuit 10 may have input-output circuitry 12 for driving signals off of IC 10 and for receiving signals from other devices via input-output pads 14. Interconnection resources 16 such as global, regional, and local vertical and horizontal conductive lines and buses may be used to route signals on IC 10. Interconnection resources 16 include fixed interconnects (conductive lines) and programmable interconnects (i.e., programmable connections between respective fixed interconnects). Programmable logic circuitry 18 may include combinational and sequential logic circuitry. The programmable logic 18 may be configured to perform custom logic functions.

Programmable logic IC 10 contains memory elements 20 that can be loaded with configuration data (also called programming data) using pads 14 and input-output circuitry 12. Once loaded, the memory elements 20 may each provide a corresponding static control output signal that controls the state of an associated logic component in programmable logic 18. Typically, the memory element output signals are used to control the gates of metal-oxide-semiconductor (MOS) transistors. In the context of programmable integrated circuits, the memory elements 20 store configuration data and are sometimes referred to as configuration random-access memory (CRAM) cells.

The following examples pertain to further embodiments. Example 1 is a detection circuit comprising: a tunable delay circuit that generates a delayed signal in response to an input signal, wherein the tunable delay circuit receives a supply voltage; a control circuit that adjusts a delay provided by the tunable delay circuit to the delayed signal relative to the input signal; and a time-to-digital converter circuit that converts the delay provided by the tunable delay circuit to the delayed signal to a digital code, wherein the time-to-digital converter circuit adjusts the digital code based on changes in the supply voltage, and wherein the control circuit causes the tunable delay circuit to maintain the delay provided to the delayed signal constant in response to a value of the digital code reaching an alignment value.

In Example 2, the detection circuit of Example 1 may optionally include, wherein the detection circuit is a power grid monitoring security sensor circuit that detects changes in the supply voltage.

In Example 3, the detection circuit of any one of Examples 1-2 may optionally include, wherein the control circuit further comprises: a finite state machine controller circuit that provides a control output indicative of a state of a finite state machine in response to the digital code; a delay configuration circuit that causes the tunable delay circuit to adjust the delay provided to the delayed signal in response to the control output indicating a first state of the finite state machine, wherein the delay configuration circuit causes the tunable delay circuit to maintain the delay provided to the delayed signal constant in response to the control output indicating a second state of the finite state machine, and wherein the finite state machine enters the second state in response to the digital code being equal to the alignment value.

In Example 4, the detection circuit of any one of Examples 1-3 may optionally include, wherein the control circuit generates a droop signal indicating that the supply voltage has decreased below a first threshold voltage in response to a decrease in the digital code below a first threshold value, and wherein the control circuit generates an overshoot signal indicating that the supply voltage has increased above a second threshold voltage in response to an increase in the digital code above a second threshold value.

In Example 5, the detection circuit of any one of Examples 1-4 may optionally include, wherein the detection circuit is a timing margin monitor sensor that provides for continuous monitoring of timing margin of a data signal relative to an edge of a clock signal and that updates the digital code in every cycle of the clock signal based on the timing margin.

In Example 6, the detection circuit of any one of Examples 1-5 may optionally further comprise: a frequency divider circuit that generates a frequency divided clock signal in response to an input clock signal, wherein the frequency divider circuit provides the frequency divided clock signal to an input of the tunable delay circuit as the input signal.

In Example 7, the detection circuit of any one of Examples 1-6 may optionally further comprise: a counter circuit that generates a binary code indicative of a number of ones in the digital code, wherein the control circuit compares the binary code to the alignment value using a comparator, and wherein the control circuit causes the tunable delay circuit to maintain the delay provided to the delayed signal constant in response to the binary code equaling the alignment value.

In Example 8, the detection circuit of any one of Examples 1-7 may optionally include, wherein the tunable delay circuit comprises a bi-directional, folded delay chain comprising adjustable delay cell circuits, and wherein each of the adjustable delay cell circuits comprises a data-forward circuit coupled between a first input and a first output of the adjustable delay cell circuit and a data-return circuit coupled between a second input and a second output of the adjustable delay cell circuit.

Example 9 is a monitoring circuit comprising: a tunable delay circuit that delays a delayed signal relative to a clock signal using a supply voltage; a control circuit that adjusts a delay provided by the tunable delay circuit to the delayed signal relative to the clock signal; and a time-to-digital converter circuit that generates a digital code that is indicative of the delay provided by the tunable delay circuit to the delayed signal, wherein the time-to-digital converter circuit adjusts the digital code based on changes in the supply voltage; and a counter circuit that converts the digital code to a binary code, wherein the control circuit maintains the delay provided by the tunable delay circuit to the delayed signal constant based on a value of the binary code equaling an alignment value.

In Example 10, the monitoring circuit of Example 9 may optionally include, wherein the control circuit generates a droop signal indicating that the supply voltage has decreased below a lower threshold voltage in response to a decrease in the binary code below a lower threshold value, and wherein the control circuit generates an overshoot signal indicating that the supply voltage has increased above an upper threshold voltage in response to an increase in the binary code above an upper threshold value.

In Example 11, the monitoring circuit of any one of Examples 9-10 may optionally include, wherein the time-to-digital converter circuit partitions the digital code into multiple segments, and wherein the control circuit aligns any of the segments of the digital code to the alignment value.

In Example 12, the monitoring circuit of any one of Examples 9-11 may optionally include, wherein the monitoring circuit functions as a timing margin monitor on an integrated circuit that causes the binary code to track the supply voltage in every cycle of the clock signal in the integrated circuit within the latency of one cycle of the clock signal.

In Example 13, the monitoring circuit of any one of Examples 9-12 may optionally further comprise: a flip-flop circuit that generates the clock signal in response to an additional clock signal; and an inverter circuit coupled to an input and to an output of the flip-flop circuit, wherein the flip-flop circuit and the inverter circuit cause a frequency of the clock signal to be a fraction of a frequency of the additional clock signal.

In Example 14, the monitoring circuit of any one of Examples 9-13 may optionally include, wherein the control circuit comprises: a finite state machine controller circuit that provides a control output in response to the binary code; and a delay configuration circuit that causes the tunable delay circuit to adjust the delay provided to the delayed signal in response to the control output indicating the value of the binary code not equaling the alignment value.

In Example 15, the monitoring circuit of Example 14 may optionally include, wherein the delay configuration circuit causes the tunable delay circuit to maintain the delay provided to the delayed signal constant in response to the control output indicating the value of the binary code being equal to the alignment value.

Example 16 is a method for monitoring a supply voltage in an integrated circuit, wherein the method comprises: generating a delayed signal using a tunable delay circuit, wherein the tunable delay circuit receives the supply voltage; adjusting a delay provided by the tunable delay circuit to the delayed signal using a control circuit; converting the delay provided by the tunable delay circuit to the delayed signal to a digital code using a time-to-digital converter circuit; causing the tunable delay circuit to maintain the delay provided to the delayed signal constant in response to a value of the digital code reaching an alignment value; and adjusting the digital code based on a change in the supply voltage using the time-to-digital converter circuit.

In Example 17, the method of Example 16 may optionally further comprise: generating an overshoot signal indicating that the supply voltage has increased above an upper threshold voltage in response to an increase in the digital code above an upper threshold value using the control circuit; and generating a droop signal indicating that the supply voltage has decreased below a lower threshold voltage in response to a decrease in the digital code below a lower threshold value using the control circuit.

In Example 18, the method of any one of Examples 16-17 may optionally further comprise: processing data indicated by the digital code in real-time using pattern recognition with signal template matching to identify patterns in the data that indicate anomalies in the supply voltage on a power grid in the integrated circuit.

In Example 19, the method of any one of Examples 16-18 may optionally further comprise: converting the digital code from a thermometer code to a binary code using a counter circuit; and comparing the binary code to the alignment value using the control circuit, wherein causing the tunable delay circuit to maintain the delay provided to the delayed signal constant further comprises causing the tunable delay circuit to maintain the delay provided to the delayed signal constant in response to the binary code equaling the alignment value.

In Example 20, the method of any one of Examples 16-19 may optionally further comprise: generating a frequency divided clock signal in response to an input clock signal using a frequency divider circuit; and providing the frequency divided clock signal to an input of the tunable delay circuit, wherein generating the delayed signal using the tunable delay circuit comprises delaying pulses in the frequency divided clock signal to generate the delayed signal using the tunable delay circuit.

The foregoing description of the exemplary embodiments has been presented for the purpose of illustration. The foregoing description is not intended to be exhaustive or to be limiting to the examples disclosed herein. In some instances, various features can be employed without a corresponding use of other features as set forth. Many modifications, substitutions, and variations are possible in light of the above teachings, without departing from the scope of the present embodiments.

What is claimed is:

1. A detection circuit comprising:
   a tunable delay circuit that generates a delayed signal in response to an input signal, wherein the tunable delay circuit receives a supply voltage;
   a control circuit that adjusts a delay provided by the tunable delay circuit to the delayed signal relative to the input signal; and
   a time-to-digital converter circuit that converts the delay provided by the tunable delay circuit to the delayed signal to a digital code, wherein the time-to-digital converter circuit adjusts the digital code based on changes in the supply voltage, and
   wherein the control circuit causes the tunable delay circuit to maintain the delay provided to the delayed signal constant in response to a value of the digital code reaching an alignment value.

2. The detection circuit of claim 1, wherein the detection circuit is a power grid monitoring security sensor circuit that detects changes in the supply voltage.

3. The detection circuit of claim 1, wherein the control circuit further comprises:
   a finite state machine controller circuit that provides a control output indicative of a state of a finite state machine in response to the digital code;
   a delay configuration circuit that causes the tunable delay circuit to adjust the delay provided to the delayed signal in response to the control output indicating a first state of the finite state machine,
   wherein the delay configuration circuit causes the tunable delay circuit to maintain the delay provided to the delayed signal constant in response to the control output indicating a second state of the finite state machine, and wherein the finite state machine enters the second state in response to the digital code being equal to the alignment value.

4. The detection circuit of claim 1, wherein the control circuit generates a droop signal indicating that the supply voltage has decreased below a first threshold voltage in response to a decrease in the digital code below a first threshold value, and wherein the control circuit generates an overshoot signal indicating that the supply voltage has increased above a second threshold voltage in response to an increase in the digital code above a second threshold value.

5. The detection circuit of claim 1, wherein the detection circuit is a timing margin monitor sensor that provides for continuous monitoring of timing margin of a data signal relative to an edge of a clock signal and that updates the digital code in every cycle of the clock signal based on the timing margin.

6. The detection circuit of claim 1 further comprising:
   a frequency divider circuit that generates a frequency divided clock signal in response to an input clock signal, wherein the frequency divider circuit provides the frequency divided clock signal to an input of the tunable delay circuit as the input signal.

7. The detection circuit of claim 1 further comprising:
a counter circuit that generates a binary code indicative of a number of ones in the digital code, wherein the control circuit compares the binary code to the alignment value using a comparator, and wherein the control circuit causes the tunable delay circuit to maintain the delay provided to the delayed signal constant in response to the binary code equaling the alignment value.

8. The detection circuit of claim 1, wherein the tunable delay circuit comprises a bi-directional, folded delay chain comprising adjustable delay cell circuits, and wherein each of the adjustable delay cell circuits comprises a data-forward circuit coupled between a first input and a first output of the adjustable delay cell circuit and a data-return circuit coupled between a second input and a second output of the adjustable delay cell circuit.

9. A monitoring circuit comprising:
a tunable delay circuit that delays a delayed signal relative to a clock signal using a supply voltage;
a control circuit that adjusts a delay provided by the tunable delay circuit to the delayed signal relative to the clock signal; and
a time-to-digital converter circuit that generates a digital code that is indicative of the delay provided by the tunable delay circuit to the delayed signal, wherein the time-to-digital converter circuit adjusts the digital code based on changes in the supply voltage; and
a counter circuit that converts the digital code to a binary code, wherein the control circuit maintains the delay provided by the tunable delay circuit to the delayed signal constant based on a value of the binary code equaling an alignment value.

10. The monitoring circuit of claim 9, wherein the control circuit generates a droop signal indicating that the supply voltage has decreased below a lower threshold voltage in response to a decrease in the binary code below a lower threshold value, and wherein the control circuit generates an overshoot signal indicating that the supply voltage has increased above an upper threshold voltage in response to an increase in the binary code above an upper threshold value.

11. The monitoring circuit of claim 9, wherein the time-to-digital converter circuit partitions the digital code into multiple segments, and wherein the control circuit aligns any of the segments of the digital code to the alignment value.

12. The monitoring circuit of claim 9, wherein the monitoring circuit functions as a timing margin monitor on an integrated circuit that causes the binary code to track the supply voltage in every cycle of the clock signal in the integrated circuit within the latency of one cycle of the clock signal.

13. The monitoring circuit of claim 9 further comprising:
a flip-flop circuit that generates the clock signal in response to an additional clock signal; and
an inverter circuit coupled to an input and to an output of the flip-flop circuit, wherein the flip-flop circuit and the inverter circuit cause a frequency of the clock signal to be a fraction of a frequency of the additional clock signal.

14. The monitoring circuit of claim 9, wherein the control circuit comprises:
a finite state machine controller circuit that provides a control output in response to the binary code; and
a delay configuration circuit that causes the tunable delay circuit to adjust the delay provided to the delayed signal in response to the control output indicating the value of the binary code not equaling the alignment value.

15. The monitoring circuit of claim 14, wherein the delay configuration circuit causes the tunable delay circuit to maintain the delay provided to the delayed signal constant in response to the control output indicating the value of the binary code being equal to the alignment value.

16. A method for monitoring a supply voltage in an integrated circuit, wherein the method comprises:
generating a delayed signal using a tunable delay circuit, wherein the tunable delay circuit receives the supply voltage;
adjusting a delay provided by the tunable delay circuit to the delayed signal using a control circuit;
converting the delay provided by the tunable delay circuit to the delayed signal to a digital code using a time-to-digital converter circuit;
causing the tunable delay circuit to maintain the delay provided to the delayed signal constant in response to a value of the digital code reaching an alignment value; and
adjusting the digital code based on a change in the supply voltage using the time-to-digital converter circuit.

17. The method of claim 16 further comprising:
generating an overshoot signal indicating that the supply voltage has increased above an upper threshold voltage in response to an increase in the digital code above an upper threshold value using the control circuit; and
generating a droop signal indicating that the supply voltage has decreased below a lower threshold voltage in response to a decrease in the digital code below a lower threshold value using the control circuit.

18. The method of claim 16 further comprising:
processing data indicated by the digital code in real-time using pattern recognition with signal template matching to identify patterns in the data that indicate anomalies in the supply voltage on a power grid in the integrated circuit.

19. The method of claim 16 further comprising:
converting the digital code from a thermometer code to a binary code using a counter circuit; and
comparing the binary code to the alignment value using the control circuit, wherein causing the tunable delay circuit to maintain the delay provided to the delayed signal constant further comprises causing the tunable delay circuit to maintain the delay provided to the delayed signal constant in response to the binary code equaling the alignment value.

20. The method of claim 16 further comprising:
generating a frequency divided clock signal in response to an input clock signal using a frequency divider circuit; and
providing the frequency divided clock signal to an input of the tunable delay circuit, wherein generating the delayed signal using the tunable delay circuit comprises delaying pulses in the frequency divided clock signal to generate the delayed signal using the tunable delay circuit.

* * * * *